(12) United States Patent
Kuiper (10) Patent No.: US 7,440,141 B2
(45) Date of Patent: Oct. 21, 2008

(54) METHOD FOR GENERATING A DITHER MASK

(75) Inventor: Paul Kuiper, Eindhoven (NL)

(73) Assignee: Océ-Technologies B.V., Ma Venlo (NL)

( * ) Notice: Subject to any disclaimer, the term of this patent is extended or adjusted under 35 U.S.C. 154(b) by 672 days.

(21) Appl. No.: 11/151,369

(22) Filed: Jun. 14, 2005

(65) Prior Publication Data

US 2005/0286084 A1 Dec. 29, 2005

(30) Foreign Application Priority Data

Jun. 14, 2004 (EP) .................................. 04076720

(51) Int. Cl.
*G06K 15/00* (2006.01)
(52) U.S. Cl. .................... 358/3.19; 358/3.06; 358/3.13; 358/535
(58) Field of Classification Search ................ 358/3.06, 358/3.13, 3.16, 3.19, 3.2, 534, 535, 536
See application file for complete search history.

(56) References Cited

U.S. PATENT DOCUMENTS

| | | | |
|---|---|---|---|
| 5,111,310 A | 5/1992 | Parker et al. | |
| 5,535,020 A | 7/1996 | Ulichney | |
| 5,696,602 A * | 12/1997 | Cooper et al. | 358/3.19 |
| 5,963,715 A * | 10/1999 | Shu et al. | 358/1.9 |
| 6,304,340 B1 * | 10/2001 | Wang | 358/1.9 |

| | | | |
|---|---|---|---|
| 2002/0163528 A1 | 11/2002 | Cooper | |
| 2003/0035146 A1 | 2/2003 | Yu et al. | |
| 2004/0085588 A1 | 5/2004 | Loce et al. | |

FOREIGN PATENT DOCUMENTS

| | | | |
|---|---|---|---|
| EP | 0 606 992 A2 | 7/1994 | |
| EP | 1 241 865 A2 | 9/2002 | |

OTHER PUBLICATIONS

Lermant, "Efficient design of large threshold arrays for accurate tone reproduction", IS&T's 48th Annual Conference Proceedings, France, pp. 530-535, 1995.
Kang, Digital Color Halftoning, IEEE Press, 1999, pp. 279-284.

* cited by examiner

*Primary Examiner*—Thomas D Lee
(74) *Attorney, Agent, or Firm*—Birch, Stewart, Kolasch & Birch, LLP (57) ABSTRACT

A method for generating a dither mask is disclosed using a local stochastic technique for use for the halftoning of grey scale images by a pixel by pixel comparison of the images against the dither mask. The dither mask is generated by producing a sequence of dot profiles (each dot profile of the sequence corresponding to a grey scale level) using a stacking constraint with incremental grey scale level such that for each dot profile of the sequence the same pixels are selected compared to the preceding dot profile and the increment in the or each dot profile is realized by selecting at least one additional pixel. When determining the position of an additional pixel, the aspect ratio between the dot pitch in a predetermined direction and a direction perpendicular thereto when rendering images is taken into account.

16 Claims, 5 Drawing Sheets

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

| 1 | 9 | 3 | 11 |
|---|---|---|----|
| 15 | 5 | 13 | 7 |
| 4 | 12 | 2 | 10 |
| 14 | 8 | 16 | 6 |

| 1 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 2 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

| 1 | 0 | 0 | 9 | 3 | 0 | 0 | 11 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 15 | 0 | 0 | 5 | 13 | 0 | 0 | 7 |
| 4 | 0 | 0 | 12 | 2 | 0 | 0 | 10 |
| 0 | 0 | 0 | 0 | 0 | 0 | 0 | 0 |
| 0 | 0 | 0 | 0 | 0 | 0 | 0 | 0 |
| 14 | 0 | 0 | 8 | 16 | 0 | 0 | 6 |

Fig.4

| 0 | 0 | 0 | 0 | 0 | 0 |
|---|---|---|---|---|---|
| 6 | 0 | 14 | 0 | 0 | 6 |
| 0 | 11 | 1 | 0 | 0 | 9 | 3 | 0 | 0 | 11 |
| 0 | 0 | 0 | *17* | 0 | 0 | 0 | 0 | 0 | 0 |
| 0 | 0 | 0 | 0 | 0 | 0 | 0 | 0 | 0 | 0 |
| 0 | 7 | 15 | 0 | 0 | 5 | 13 | 0 | 0 | 7 |
|  |  | 4 | 0 | 0 | 12 | 2 | 0 | 0 | 10 |
|  |  | 0 | 0 | 0 | 0 | 0 | 0 | 0 | 0 |
|  |  | 0 | 0 | 0 | 0 | 0 | 0 | 0 | 0 |
|  |  | 14 | 0 | 0 | 8 | 16 | 0 | 0 | 6 |

METHOD FOR GENERATING A DITHER MASK

This application claims the benefit of the European Patent Application No. 04076720.4 filed on Jun. 14, 2004, which is hereby incorporated by reference.

FIELD OF THE INVENTION

The present invention is related to the halftoning of continuous tone or grey scale images for reproduction on a printing or copying system. Particularly of interest are methods for generating a dither mask for use for the halftoning of grey scale images.

BACKGROUND OF THE INVENTION

Halftoning is a conversion technique enabling to render continuous tone images or grey scale images on printing devices having a lower tonal resolution. In case of a bi-tonal device, continuous tone information is simulated by controlling the coverage or in other words the amount of pixels in a multi pixel area which are actually rendered as image dots. There is a trade off between spatial resolution and tonal resolution. As a result of the halftoning method, image dots are formed in certain ordered patterns. This may lead to visible artifacts or textures in the printed image. To reduce the appearance of these artifacts the halftoning technique is to be designed to produce patterns that are optimally pleasing for the human eye when printing on a non-ideal printer.

Halftoning techniques can be classified into two main categories: Amplitude Modulated (AM) halftoning and Frequency Modulated (FM) halftoning. In AM halftoning, halftone cells are laid out on a grid with a fixed spatial frequency and angle. The tone is modulated by varying the size of the halftone element (amplitude). In FM halftoning, the halftone element size is constant and may be chosen equal to the size of one pixel but the average distance between the elements (frequency) is varied to produce a certain tone. In contrast to AM halftoning, there are no fixed frequencies or angles.

FM halftoning can be further divided into two subcategories: dithering and error diffusion. FM dithering is characterized by a pixel by pixel comparison of the grey scale images against a dither mask comprising threshold values. The threshold values in the dither mask represent the order in which pixels are turned on for each grey scale level. The dither mask has a predetermined size and is tessellated over the entire image thereby defining a screen such that the grey scale level of each pixel can be compared with a corresponding threshold value of the dither mask enabling to decide whether an image dot is to be printed or not. When halftoning using an error diffusion technique, the grey scale level of each pixel is compared with a corresponding threshold value of the dither mask, however when deciding whether an image dot is to printed or not, the information resulting from comparing neighbouring pixels with their corresponding threshold values is taken into account. Error diffusion techniques are however known to create worm artifacts at low grey scale levels and to require high processing resources.

From all techniques described above, FM dithering seems to be at present the most interesting halftoning technique. FM dithering may however be further divided into stochastic and non-stochastic dithering. In stochastic dithering the threshold values are positioned randomly within the dither mask whereas in non-stochastic dithering the threshold values are positioned in the dither mask in a predetermined order. A potential disadvantage of using non-stochastic dithering masks is that highly structured image dot patterns may be produced which are highly susceptible to positioning errors and hence may introduce banding effects. In stochastic dithering the random or pseudo random positioning of the threshold values in the dither mask is typically based on the global minimization of some spatial or frequency energy function. Examples of stochastic dither masks include the "blue noise masks" as described in U.S. Pat. No. 5,111,310 (Parker et al.), the dither masks generated by the "void and cluster method" as described in U.S. Pat. No. 5,535,020 (Ulichney). A problem associated with the aforementioned examples is that this global stochastic approach for generating dither matrices is complex and time consuming and requires very large processing resources. This problem can be at least partially met by employing the so-called local stochastic dithering technique suggested in "Efficient design of large threshold arrays for accurate tone reproduction", IS&T's $48^{th}$ Annual Conference Proceedings, Pages 530-535 by P. Lermant instead of the global stochastic approaches described in U.S. Pat. No. 5,111,310 and U.S. Pat. No. 5,535,020.

When, in order to enable reproduction on a printer, images are halftoned using a screen being based on a global or local stochastic dither mask. In general no direction dependency is taken into account or in other words the stochastic dither mask is generated isotropic. In practice however, the printer may have at least in a printing mode a different print resolution in the print medium propagation direction and a direction perpendicular thereto. For instance, in case the printer is a so-called scanning printer, the printer may have a different printing resolution in the scanning direction and the sub scanning direction, i.e. usually the print medium propagation direction. The fact that stochastic dither masks are not designed to cope with a difference in resolution in both print directions leads to undesired and perceptually disturbing snake-like textures in the printed image in the direction having the higher printer resolution.

SUMMARY OF THE INVENTION

It is an object of the invention to provide a method and computer program for generating dither masks using a stochastic technique. The generation of the dither masks should be such that undesired textures in printed images which are halftoned using these dither masks are avoided or at least limited, in particular when such images are to be printed with a different resolution along the print medium, i.e. the print medium propagation direction, and across the print medium, i.e. a direction perpendicular to the print medium propagation direction.

It is another object of the invention to provide a method for generating dither masks, which overcomes the limitations and problems associated with the background art.

It is a further object of the invention to provide a method for generating dither masks using a stochastic technique requiring limited processing time and processing resources.

To meet these and other objects, according to an embodiment of the present invention a method is disclosed for generating a dither mask using a local stochastic technique for use for the halftoning of grey scale images by a pixel by pixel comparison of the images against the dither mask, the method comprising the step of generating the dither mask by producing a sequence of dot profiles, each dot profile of the sequence corresponding to a grey scale level, using a stacking constraint with incremental grey scale level such that for each dot profile of the sequence the same pixels are selected compared to the preceding dot profile and the increment in the or each dot profile is realized by selecting at least one additional pixel. The position of each additional pixel is determined dependent on the positions of the previously selected pixels using the local stochastic technique taking account of the aspect ratio between the dot pitch in a predetermined direction and a direction perpendicular thereto when rendering images.

In an embodiment of the invention, the dither mask is built-up from a number of equally sized sub-matrices, each sub-matrix having a predetermined ranking order within the dither mask, such that the selection of each additional pixel is effected by selecting one of the available positions of a selected sub-matrix. The selection of the sub-matrix is executed taking account of the ranking order of the sub-matrices and the corresponding dot profile.

Accordingly to an aspect of the present invention, the selection of an additional pixel within a selected sub-matrix is performed using a local stochastic technique. Hence the selection of an additional pixel among the available positions in the selected sub-matrix is based on the local minimization of some spatial or frequency energy function. For instance, for each available position within the selected sub-matrix the energy is calculated using a spatial energy function. To take proper account of potential differences between the dot pitch in a predetermined direction and a direction perpendicular thereto when rendering images, this aspect ratio may be used as one of the parameters of the spatial energy function. Subsequently, the pixel corresponding to the available position having the lowest energy value is selected.

In a further embodiment according to the present invention, when calculating energy values for selecting between available positions within a sub-matrix, the interaction of previously selected pixels of the selected sub-matrix as well as of the sub-matrices adjacent to the selected sub-matrix is taken into account.

According to an embodiment of the present invention, there is provided a computer program product embodied on at least one-computer-readable medium, for generating a dither mask using a local stochastic technique for use for the halftoning of grey scale images by a pixel by pixel comparison of the images against the dither mask, the program product comprising computer-executable instructions for: generating the dither mask by producing a sequence of dot profiles, each dot profile of the sequence corresponding to a grey scale level, wherein the dither mask is generated using a stacking constraint with an incremental grey scale level such that for each dot profile of the sequence the same pixels are selected compared to the preceding dot profile and the increment in the or each dot profile is realized by selecting at least one additional pixel, a position of each additional pixel being determined dependent on positions of previously selected pixels using the local stochastic technique taking account of an aspect ratio between a dot pitch in a predetermined direction and a direction perpendicular thereto when rendering images.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIGS. 6(a) and 6(b) depict two dot profiles produced for a predetermined grey scale level using a dither mask generated according to the method of the present invention. The dot profiles are produced using a printer printing in a printing mode having a print resolution of 300 dpi in the medium propagation direction, and a print resolution of 600 dpi in the direction perpendicular thereto. According to an embodiment of the present invention, FIG. 6(a) depicts a dot profile produced using a dither mask generated using a local stochastic technique where the dot pitch aspect ratio is set equal to 1, while

DETAILED DESCRIPTION OF THE PREFERRED EMBODIMENTS

In relation to the appended drawings, the preferred embodiments of the present invention are described in detail below. Several embodiments are disclosed. It is apparent however that a person skilled in the art can imagine other equivalent embodiments or other ways of executing the present invention, the scope of the present invention being limited only by the terms of the appended claims.

For image reproduction images are offered digitally to a printer. There are numerous ways to generate a digital image. For instance, a digital image may be generated by scanning an original using a scanner. Images may also be generated by a camera or a video camera. Besides digital images generated by a scanner or a camera, which are usually in a bitmap format or a compressed bitmap format also artificially created, e.g. by a computer program, digital images or documents may be offered to the printer. The latter images are in a structured format including but not limited to a page description language (PDL) format and an extensible markup language (XML) format. Examples of a PDL format are PDF (Adobe), PostScript (Adobe), and PCL (Hewlett-Packard). Regardless of the origin of the digital image, one may opt to store the digital image in a memory such that it can be easily retrieved by the printer.

The image data associated with each image may be processed by the printer so as to generate digital colour separation images in the process colours of the printer. The process colours are a limited number of colours of marking particles available on the printer. The process colours determine the maximum achievable colour gamut of the printer. Examples of process colours are black, white, cyan, magenta, yellow, red, green, blue, pink, brown and orange. Most printers such as ink-jet printers, electro(photo)graphic printers and magnetographic printers form image dots of marking particles in the process colours. Composite colours can be obtained perceptually as the human eye integrates the dot patterns formed by the printer in the respective process colours and/or physically by mixing and/or superposition of image dots of marking particles of the respective process colours. However these printers are only capable of printing a limited number of grey scale levels per pixel for each process colour which imposes a problem for the printing of grey scale or continuous tone images. The image data associated with each separation image specify at least a grey scale level or tonal level for the corresponding process colour for each pixel of the grey scale image.

The grey scale level is typically defined by using an 8-bit value which enables to distinguish between 256 grey levels per process colour. Although there are printers capable of printing up to 16 grey scale levels per pixel per process colour, most printers are only capable of printing 2 grey scale levels per pixel per process colour. Hence in order to enable the faithful reproduction of these so-called grey scale or continuous tone images, the images are halftoned. In case of a multi-colour image, each colour separation image may be halftoned using a different screen.

Although the method of the present invention is in no way limited thereto, in the sequel, when reference is made to halftoning this is considered to be binary halftoning while when reference is made to a printer this is considered to be a printer capable only of printing 2 grey scale levels per pixel per process colour. By consequence halftoning a separation image is the conversion for each pixel of the multi-bit (typical 8-bit) value identifying the grey scale level of the corresponding process colour into a single bit value, i.e. "0" or "1". This single bit value indicates whether or not an image dot of the corresponding process colour is to be printed.

Figure 7:
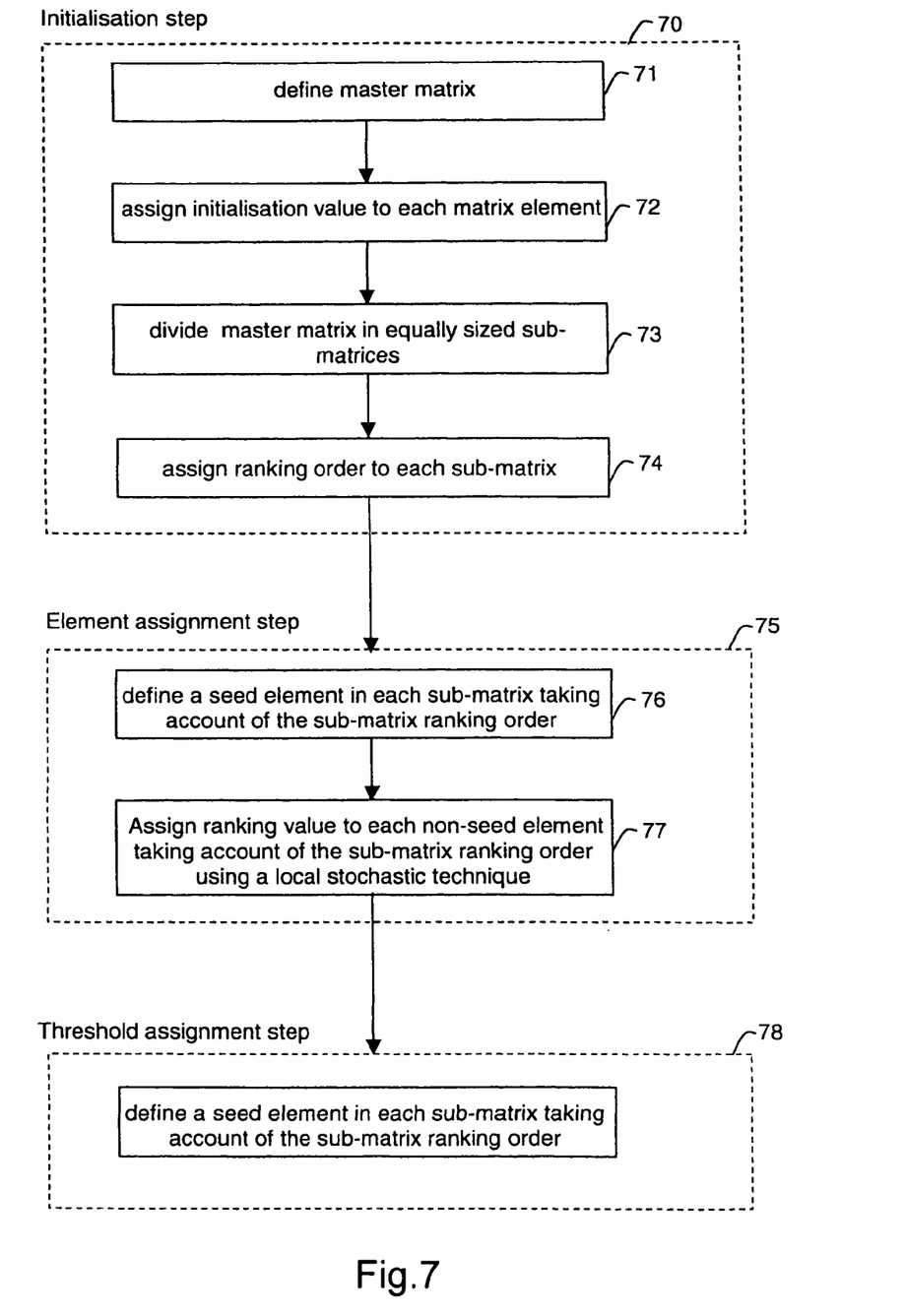
FIG. 7 depicts a method of generating a dither mask using a local stochastic technique according to an embodiment of the present invention.

In an embodiment of the invention with reference to FIG. 7, a dither mask for use for the halftoning of grey scale images is generated using a local stochastic technique. This generation is basically a three-step process and proceeds as follows. In the first step, i.e. the initialization phase (70), first a matrix is defined as having a number of elements which is an integer plurality of the maximum of number of grey scale levels of the separation image. The integer value is at least two. This matrix is called the master matrix (71). An initialization value, e.g. zero, is assigned to each element of the master matrix (72). This master matrix is divided into a plurality of equally sized sub-matrices (73). Preferably the sub-matrices have at least a number of elements equal to the maximum number of grey scale levels of the separation image. An integer value is assigned to each sub-matrix, the integer value being uniquely selected from 1 to the number of sub-matrices and representing a ranking order for the respective sub-matrices within the master matrix (74). This ranking of the sub-matrices may take place in a structured way e.g. using Bayer's procedure of maximum separation between two consecutive sub-matrices. Explicit reference is made to "Digital Color Halftoning", H. R. Kang, p. 279-284, IEEE Press, where Bayer's procedure is explained in depth.

After ranking of the sub-matrices, in the second step, i.e. the element assignment step (75), the initialization value of each element of the master matrix is to be replaced by a unique integer value which will be incrementally assigned to each element of the master matrix hence establishing a ranking order between the elements. In the third step, i.e. the threshold assignment step (78), this element ranking order will be used to assign a threshold value to each matrix element. When assigning integer values to each of the matrix elements, the ranking order of the sub-matrices is taken into account. Hence one of the matrix elements of sub-matrix 1 is assigned the integer value 1, subsequently one of the matrix elements of sub-matrix 2 is assigned the integer value 2. This is continued incrementally till each sub-matrix has an element having a value different from its initialization value (76). These elements are so-called seed elements as they are the first element within each sub-matrix having a value different from the initialization value. The selection of a seed element within a particular sub-matrix may take place according to a predetermined pattern or randomly. During this selection (76) each sub-matrix is considered independently from its neighbouring sub-matrices.

In case multiple dither masks are to be generated for rendering a multi-colour image, the selection of seed elements within sub-matrices of a master matrix associated with a particular process colour is preferably correlated with the selection of seed elements for the other process colours. For instance in case of a CMYK printer, the selection of seed elements for generating the dither mask associated with e.g. the black process colour may take place according to a predetermined pattern. For the selection of additional seed elements for generating the dither masks associated with the other process colours, the already selected seed elements including those associated with the black process colour are taken into account, e.g. the selection of additional seed elements may be based on the local minimisation of some spatial or frequency energy function.

Next in the stochastic phase (77) an incremental integer value is also assigned to each of the remaining elements of the master matrix. The remaining elements are the elements still having their initialization value. The incremental integer assignment is effected taking the ranking order of the sub-matrices into account. This means that a second element in sub-matrix 1 is assigned a value equal to the number of sub-matrices+1, subsequently a second element in sub-matrix 2 is assigned a value equal to the number of sub-matrices+2. This is continued till the initialization value of each of the remaining elements is replaced by an integer value ranging from the number of sub-matrices+1 to the number of elements in the master matrix. The assignment of integer values to the remaining elements proceeds according to a stochastic technique. As the assignment has always to take place to an element of a predetermined sub-matrix instead of all possible remaining elements of the master matrix, the technique is called a local stochastic technique. The master matrix is converted to a dither matrix or dither mask by replacing the element values by threshold values (78). The number of threshold values is chosen dependent upon the number of grey scale levels of the separation images. When opting for a linear conversion approach, each grey scale level corresponds to a corresponding threshold value. As there are more matrix elements than threshold values, a number of elements may have the same value.

The assignment of the threshold values is such that the lowest threshold value, corresponding to the lowest grey scale level of the separation image, is assigned to the matrix elements having the lowest integer values or in other words the lowest ranking. Hence the lowest threshold value is first assigned to the matrix element with integer value 1 and also to matrix elements with integer values 2 to 8 if the ratio between the number of elements of the master matrix and the number of grey scale levels is e.g. 8. By consequence the dot profile corresponding to the lowest grey scale level produced when using this dither mask has eight pixels rendered. The second lowest threshold value is assigned to the matrix elements with integer values 9 to 16. By consequence the dot profile corresponding to the second lowest grey scale level produced when using this dither mask has 16 pixels rendered, being the eight pixels corresponding to the lowest grey scale level and eight additional ones. Hence, the dither mask is formed by producing a sequence of dot profiles, each dot profile of the sequence corresponds to a grey scale level, using a stacking constraint with incremental grey scale level such that for each dot profile of the sequence the same pixels are selected compared to the preceding dot profile and the increment in the or each dot profile is realised by adding additional pixels.

To provide a better insight and for clarification purposes, the dither mask generation method using a local stochastic technique according to the present invention will now further be discussed below by means of a specific example. It is clear that this specific example is only an exemplary embodiment and may not be used to limit the scope of the present invention.

EXAMPLE

Figure 1:
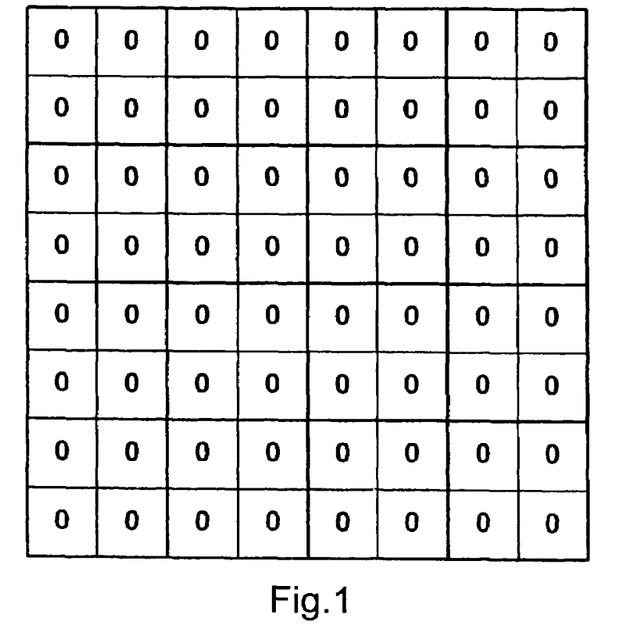
FIG. 1 depicts an 8×8 master matrix wherein each element has a zero initialisation value according to an exemplary embodiment of the present invention.
Figure 2:
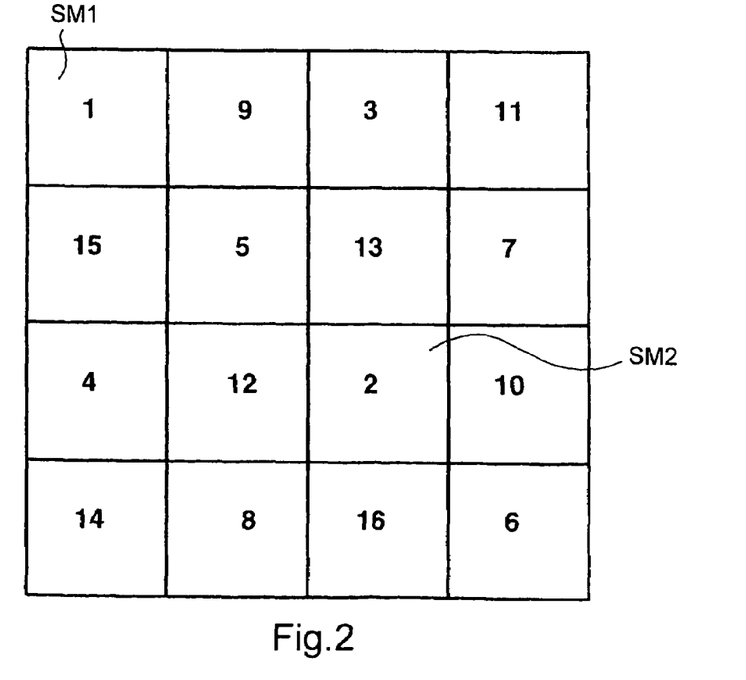
FIG. 2 depicts the 8×8 master matrix of FIG. 1, which is subdivided in 16 2×2 sub-matrices, each of the sub-matrices having a ranking order assigned thereto according to an embodiment of the present invention.
Figure 3:
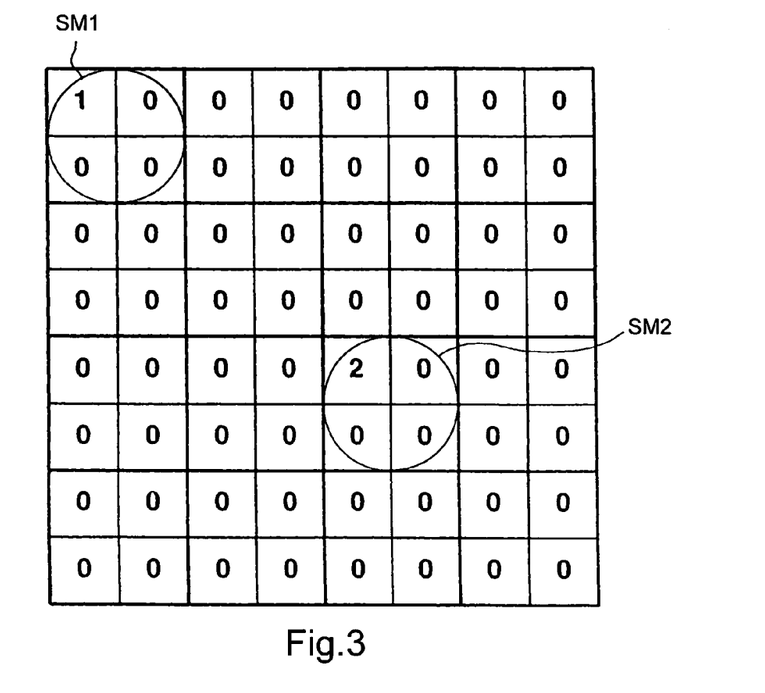
FIGS. 3, 4 and 5 each depict an intermediate stage of the master matrix of FIG. 1 wherein the zero initialization values are gradually replaced by incremental integer values according to an embodiment of the present invention.
Figure 4:
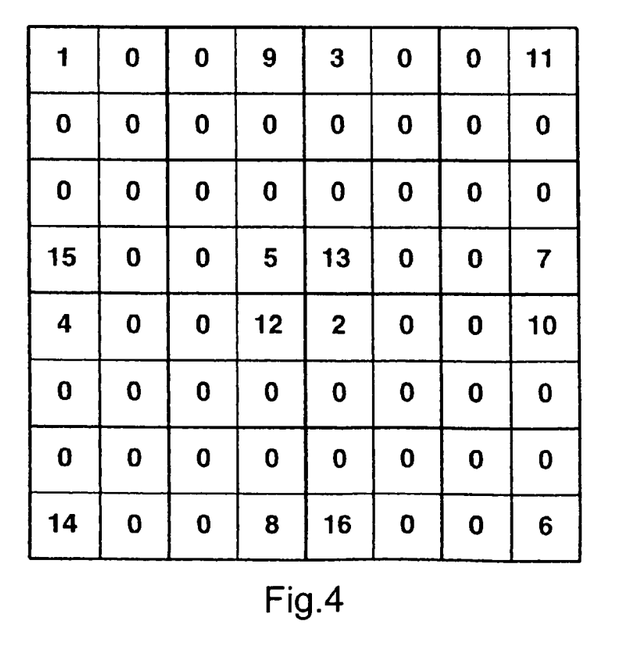

Assume that a dither mask is to be generated for use for the halftoning of a grey scale image having only 4 grey scale levels. In practice this is usually at least 256. The master matrix should have a number of elements being an integer plurality of the number of grey scale levels, the integer value being at least two. Assume that this integer value is chosen to be 16, thus defining an 8×8 master matrix having 64 matrix elements. As demonstrated in FIG. 1, an initialization value being zero is assigned to each element of the master matrix. The master matrix is divided in 16 equally sized 2×2 sub-matrices. Hence each sub-matrix includes four elements, being as many elements as the number of grey scale levels of the separation image. As demonstrated in FIG. 2, the sub-matrices are ranked by assigning an incremental integer value to each of the sub-matrices, starting with the integer value one and ending with the integer value 16. Subsequently, the initialization value of each element of the master matrix is to be replaced by a unique integer value which will be incrementally assigned to each element of the master matrix hence establishing a ranking order between the elements. When assigning values to each of the matrix elements, the ranking order of the sub-matrices is taken into account. Initially a value is assigned to one matrix element of each sub-matrix, i.e. the so-called seed elements. Hence, as can be seen in FIGS. 2 and 3, one of the matrix elements of the first sub-matrix (SM1) is assigned the integer value 1, being the upper left element of the first sub-matrix in this example. Subsequently one of the matrix elements of sub-matrix 2 (SM2) is assigned the integer value 2, being the upper left element of sub-matrix 2 in this example. This is continued incrementally till each of the 16 sub-matrices has a seed element having a value ranging from 1 to 16 as can be seen in FIG. 4. When assigning seed elements each sub-matrix is considered independently from its neighbouring sub-matrices.

Figure 5:
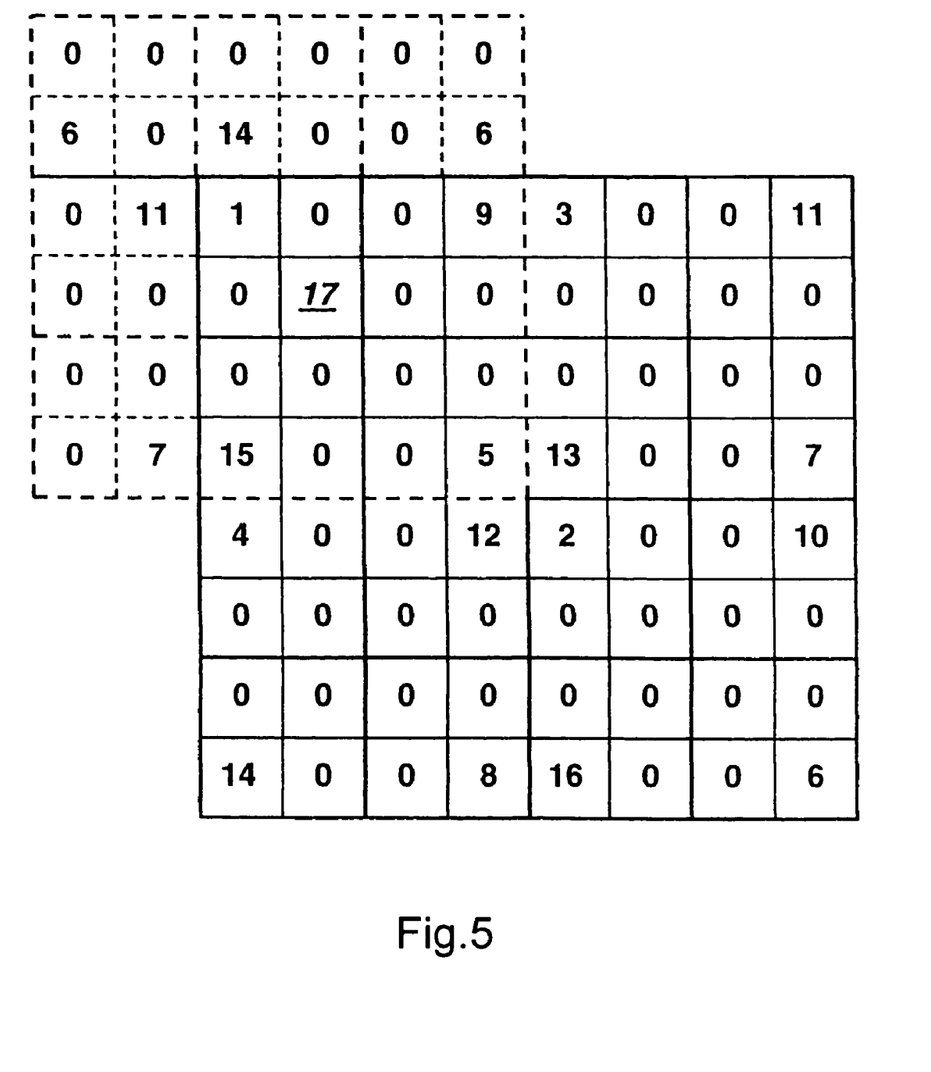

Next in the stochastic phase an incremental integer value is also assigned to each of the remaining elements of the master matrix, the remaining elements being the elements still having their initialization value, taking the ranking order of the sub-matrices into account. This means that as shown in FIG. 5, a second element in sub-matrix 1 is assigned the value 17, being the value equal to the number of sub-matrices+1. The assignment of an integer value to this element and also to the other remaining elements proceeds according to a local stochastic technique. In particular, for each of the remaining elements of sub-matrix 1 having indices (u,v), an energy value is calculated representative for the energy imposed by neighbouring elements (i,j) having a value different from their initialization value, being in this example a non-zero value, on the element with indices (u,v). The neighbouring elements are in this example the non-zero elements of the respective sub-matrix and the non-zero elements of the 8 adjacent sub-matrices. As can be seen in FIG. 5, in case of selection of a new element in sub-matrix 1, the eight adjacent sub-matrices are the sub-matrices with ranking order 6, 14, 8, 9, 5, 15, 7, 11. The energy value for each of the remaining elements of sub-matrix 1 is calculated using the following equation:

$$E(u, v) = \sum_i \sum_j e^{-\frac{|d((u,v),(i,j))|^2}{\sigma^2}}$$

$$|d((u, v), (i, j))| = \sqrt{\frac{(u-i)^2 + (v-j)^2}{A_R^2 \cos^2\theta + \sin^2\theta}}$$

wherein $\theta$ is the angle in the Cartesian plane, $A_R$ is the aspect ratio when printing between the image dot pitch in a predetermined direction and the direction perpendicular thereto and $\sigma$ is a parameter which may be chosen dependent on how many neighbouring elements are to be taken into account when calculating the energy value of a matrix element. The value 17 is now assigned to the remaining element in sub-matrix 1 having the lowest energy value E(u,v). In this example this is the lower right element as can be seen in FIG. 5.

Subsequently, a second element in sub-matrix 2 is assigned a value equal to the number of sub-matrices+2. This is the element in sub-matrix 2 having the lowest energy value of the elements within sub-matrix 2 having value zero. This procedure is continued till the initialization value of each of the remaining elements is replaced by an integer value ranging from the number of sub-matrices+1, being 17, to the number of elements in the master matrix, being 64.

The master matrix is converted to a dither matrix or dither mask by replacing the element values by threshold values. According to this example, a linear conversion approach is applied such that each grey scale level corresponds to a corresponding threshold value. The assignment of the threshold values is such that the lowest threshold value, corresponding to grey scale level 1 of the separation image, is assigned to the matrix elements having with integer values 1 to 16. By consequence the dot profile having the same size as the size of the master matrix corresponding to the lowest grey scale level generated when using this dither mask has sixteen pixels rendered. The second lowest threshold value is assigned to the matrix elements with integer values 17 to 32. By consequence the dot profile corresponding to grey scale level 2 generated when using this dither mask has 32 pixels rendered, being the pixels corresponding to grey scale level 1 and sixteen additional ones. By producing the dot profiles corresponding to grey scale levels three and four, the dither mask is completed.

Figure 6A:
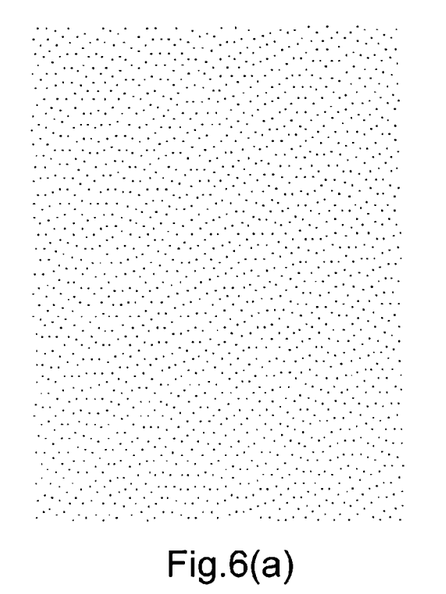
Figure 6B:
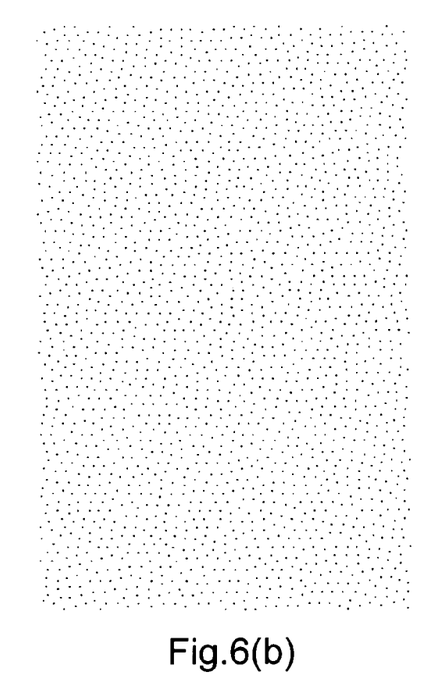
FIG. 6(b) depicts a dot profile produced using a dither mask generated using a local stochastic technique where the dot pitch aspect ratio is set equal to 2.

When generating dot profiles according to the present invention with an inkjet printer in a monochrome black mode, the influence of varied control of the aspect ratio when applying a local stochastic procedure is demonstrated. Suppose the printer prints in a printing mode having a print resolution of 300 dpi in the medium propagation direction, or in other words a dot pitch of about 84 µm, and a print resolution of 600 dpi in the scanning direction, or in other words a dot pitch of about 42 µm and the dot profile corresponding to a predetermined grey scale level. First the dot profile produced without taking the difference in dot pitch into account when generating the dither mask, or in other words $A_R$ is set equal to 1, is printed in this printing mode. As can be seen in FIG. 6(a) the dot profile produced using a dither mask generated with an isotropic local stochastic procedure contains snake-like artifacts in the scanning direction, i.e. the direction with the highest print resolution. Subsequently, the dot profile produced taking the difference in dot pitch into account when generating the dither mask, or in other words $A_R$ is set equal to 2, is printed in this printing mode. As can be seen in FIG. 6(b) the dot profile produced using a dither mask generated taking account of the differences in print resolution no longer contains visually disturbing artifacts.

Although, when desiring to print with a different resolution in the medium propagation direction and a direction perpendicular thereto, such as e.g. sub-scanning and scanning direction in case of a scanning ink-jet printer, best results are obtained using a local stochastic technique taking account of the aspect ratio between the dot pitch in these directions by introducing this aspect ratio when determining the interaction between matrix elements. It is clear that the aspect ratio can equally be taken into account when employing a general stochastic technique and in case of a "blue noise mask" by shaping the filter to take the aspect ratio into account.

The method of the present invention discussed above can be implemented by a printer or other suitable device that processes images for printing.

The processing steps of the present invention are implementable using existing computer programming language. Such computer programs(s) may be stored in memories such as RAM, ROM, PROM, etc. associated with computers. Alternatively, such computer program(s) may be stored in a different storage medium such as a magnetic disc, optical disc, magneto-optical disc, etc. Such computer program(s) may also take the form of a signal propagating across the Internet, extranet, intranet or other network and arriving at the destination device for storage and implementation. The computer programs are readable using a known computer or computer-based device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method for generating a dither mask using a local stochastic technique for use for the halftoning of grey scale images by a pixel by pixel comparison of the images against the dither mask, the method comprising the step of:

generating the dither mask by producing a sequence of dot profiles, each dot profile of the sequence corresponding to a grey scale level, wherein the dither mask is generated using a stacking constraint with an incremental grey scale level such that for each dot profile of the sequence the same pixels are selected compared to the preceding dot profile and the increment in the or each dot profile is realized by selecting at least one additional pixel, a position of each additional pixel being determined dependent on positions of previously selected pixels using the local stochastic technique taking account of an aspect ratio between a dot pitch in a predetermined direction and a direction perpendicular thereto when rendering images.

2. The method as recited in claim 1, wherein the dither mask is built-up from a number of equally sized sub-matrices.

3. The method as recited in claim 2, wherein each of the sub-matrixes has a predetermined ranking order within the dither mask, such that the selection of each additional pixel is effected by selecting one of the available positions within a selected sub-matrix.

4. The method as recited in claim 3, wherein the selecting one of the available positions within the selected sub-matrix is performed by determining for each available position within the selected sub-matrix, an energy value using a spatial energy function and selecting the available position having the lowest energy value.

5. The method as recited in claim 4, wherein when calculating an energy value using the spatial energy function, an interaction of previously selected pixels of the selected sub-matrix as well as of the sub-matrices adjacent to the selected sub-matrix is taken into account.

6. The method as recited in claim 4, wherein the aspect ratio between the dot pitch in the predetermined direction and the direction perpendicular thereto when rendering images is one of parameters of the spatial energy function.

7. The method as recited in claim 6, wherein when calculating an energy value using the spatial energy function, an interaction of previously selected pixels of the selected sub-matrix as well as of the sub-matrices adjacent to the selected sub-matrix is taken into account.

8. The method as recited in claim 1, wherein the aspect ratio between the dot pitch in the predetermined direction and the direction perpendicular thereto is one of parameters of spatial energy function.

9. A computer program product embodied on at least one computer-readable medium, for generating a dither mask using a local stochastic technique for use for the halftoning of grey scale images by a pixel by pixel comparison of the images against the dither mask, the product comprising computer-executable instructions for:

generating the dither mask by producing a sequence of dot profiles, each dot profile of the sequence corresponding to a grey scale level, wherein the dither mask is generated using a stacking constraint with an incremental grey scale level such that for each dot profile of the sequence the same pixels are selected compared to the preceding dot profile and the increment in the or each dot profile is realized by selecting at least one additional pixel, a position of each additional pixel being determined dependent on positions of previously selected pixels using the local stochastic technique taking account of an aspect ratio between a dot pitch in a predetermined direction and a direction perpendicular thereto when rendering images.

10. The computer program product as recited in claim 9, wherein the dither mask is built-up from a number of equally sized sub-matrices.

11. The computer program product as recited in claim 10, wherein each of the sub-matrixes has a predetermined ranking order within the dither mask, such that the selection of each additional pixel is effected by selecting one of the available positions within a selected sub-matrix.

12. The computer program product as recited in claim 11, wherein the selecting one of the available positions within the selected sub-matrix is performed by determining for each available position within the selected sub-matrix, an energy value using a spatial energy function and selecting the available position having the lowest energy value.

13. The computer program product as recited in claim 12, wherein the aspect ratio between the dot pitch in the predetermined direction and the direction perpendicular thereto when rendering images is one of parameters of the spatial energy function.

14. The computer program product as recited in claim 13, wherein when calculating an energy value using the spatial energy function, an interaction of previously selected pixels of the selected sub-matrix as well as of the sub-matrices adjacent to the selected sub-matrix is taken into account.

15. The computer program product as recited in claim 12, wherein when calculating an energy value using the spatial energy function, an interaction of previously selected pixels of the selected sub-matrix as well as of the sub-matrices adjacent to the selected sub-matrix is taken into account.

16. The computer program product as recited in claim 9, wherein the aspect ratio between the dot pitch in the predetermined direction and the direction perpendicular thereto is one of parameters of spatial energy function.

* * * * *